United States Patent [19]

Shida et al.

[11] 4,445,784

[45] May 1, 1984

[54] ELECTRONIC TIMEPIECE

[75] Inventors: Masaharu Shida; Makoto Ueda; Akira Torisawa; Shuji Owada; Masaaki Mandai, all of Tokyo, Japan

[73] Assignee: Kabushiki Kaisha Daini Seikosha, Tokyo, Japan

[21] Appl. No.: 357,577

[22] Filed: Mar. 12, 1982

Related U.S. Application Data

[62] Division of Ser. No. 966,115, Dec. 4, 1978, Pat. No. 4,326,278.

[30] Foreign Application Priority Data

Dec. 2, 1977 [JP] Japan ................................ 52-144651

[51] Int. Cl.[3] .......................... G04F 5/00; G05B 19/40

[52] U.S. Cl. ...................................... 368/157; 318/696

[58] Field of Search ................................ 368/155-157, 368/159-160, 76, 80, 85, 86; 318/685, 696

[56] References Cited

U.S. PATENT DOCUMENTS 3,855,781 12/1974 Chihara et al. ........................ 368/28
3,896,363 7/1975 Kinsel et al. ........................ 318/685
4,032,827 6/1977 Dobratz et al. ...................... 318/696
4,212,156 7/1980 Kawamura et al. .................. 368/85
4,326,278 4/1982 Shida et al. ......................... 365/157

*Primary Examiner*—Vit W. Miska
*Attorney, Agent, or Firm*—Robert E. Burns; Emmanuel J. Lobato; Bruce L. Adams

[57] ABSTRACT

A driver circuit for a stepping motor having a coil, a stator and a rotor receives pulse signals from a pulse signal generator to rotationally drive the rotor. A rotation detection circuit comprises switching circuitry switchable between a high impedance loop formed of the coil and a high impedance element and a low impedance loop formed of the coil and a low impedance element, and means for detecting the voltage induced in the coil. After a pulse signal is applied to the stepping motor, the switching circuitry forms the high impedance loop and the detecting means compares the voltage developed across the high impedance element with a predetermined voltage to thereby detect the rotation and non-rotation states of the rotor.

10 Claims, 19 Drawing Figures

ELECTRONIC TIMEPIECE

This is a divisional of application Ser. No. 966,115, filed Dec. 4, 1978, now U.S. Pat. No. 4,326,278.

BACKGROUND OF THE INVENTION

1. Field of the Invention

This invention relates generally to a driver circuit for a stepping motor having a rotation detection means, and in particular to for circuits driving a stepping motor, such as employed in a wrist watch, a clock and other portable devices.

2. Description of the Prior Art

FIG. 1 shows the construction of the stepping motor which is driven intermittently with low cost, small size and power dissipation, for example, the stepping motor for an analog electronic timepiece.

Such a stepping motor comprises a stator 1 made of a high permeability magnetic material, a coil 7 connected magnetically to the stator 1, and a rotor 6 made of a permanent magnet which is magnetized with more than two poles and connected magnetically to the stator 1.

The mechanical output of the rotor 6 is transferred to the gears 5, 4, 3 and 2.

The devices fixed to gears 5, 4, 3 and 2 are driven by the gears.

In such a stepping motor, the method of executing the low power dissipation attains a high efficiency of the electric-mechanical converter.

Another method of executing the low power dissipation is to provide a driver for a stepping motor which is driven with a low torque and at relatively low power at the normal time and which is driven by a higher torque and higher power when the rotor was not rotated due to a high load, etc.

The latter method is disclosed in U.S. Pat. Nos. 4,114,364 and 3,855,781. In the above driving method, the rotation detection means is important and in particular, it is undesirable in that the required space is increased, the mechanism is complicated and the power consumption is increased, in order to detect the rotation of the rotor.

SUMMARY OF THE INVENTION

The object of the invention is to provide a driver circuit for a stepping motor eliminating the above defects.

Another object of the invention is to provide a driver circuit for a stepping motor, wherein a driving coil is used as the detecting element for detecting the rotation of the rotor and the circuit for detecting the rotation of the rotor is fabricated as a C-MOS IC so that the detection of the rotation of the rotor is executed without the additional power consumption, large space and high cost and in safety.

Another object of the invention is to provide a driver circuit for a stepping motor comprising means for detecting a voltage induced in said coil by connecting said coil to a high impedance element soon after application of the pulse from a pulse signal generator, and means for comparing the induced voltage in said coil with a predetermined voltage, whereby the rotation and non-rotation of the rotor is detected by the output of the comparing means.

Still another object of the invention is to provide a driver circuit for a stepping motor having a coil, a stator and a rotor, receptive of a pulse signal from a pulse signal generator to rotate said rotor, means switchable between a high impedance loop and a low impedance loop and means for detecting the induced voltage in said coil.

DESCRIPTION OF THE PREFERRED EMBODIMENTS

Figure 1:
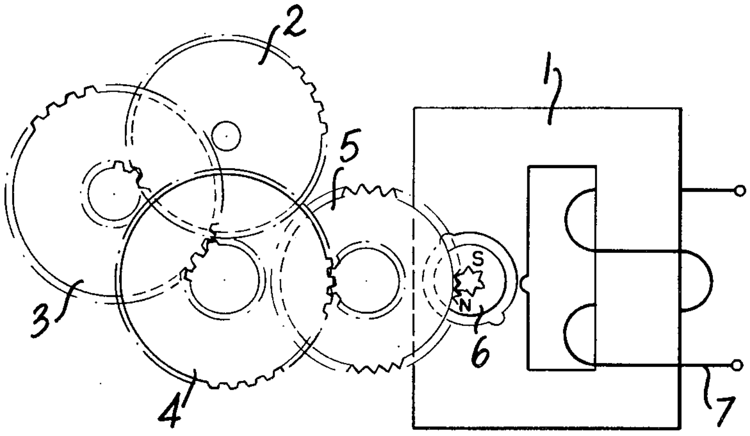
FIG. 1 (PRIOR ART)
FIG. 1 shows an example of a prior art display mechanism for a general analog display type electronic timepiece.
Figure 2:
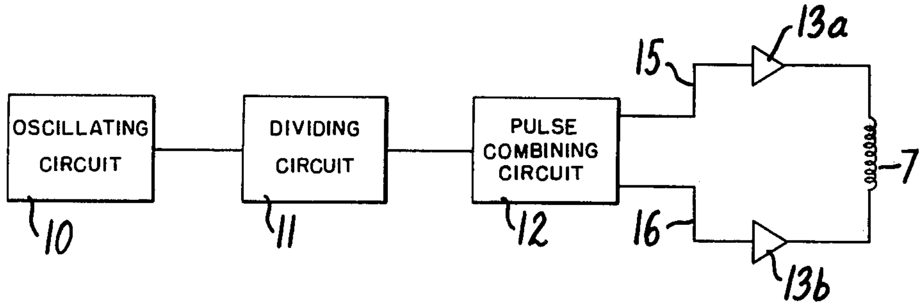
FIG. 2 (PRIOR ART)
FIG. 2 shows an example of a prior art circuit construction of the conventional stepping motor system.
Figure 3:
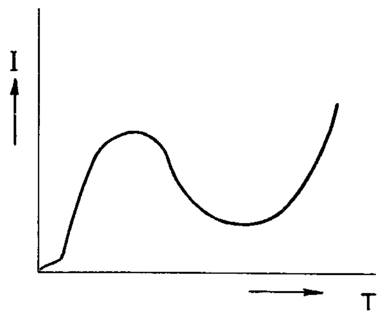
FIG. 3 (PRIOR ART)
FIG. 3 shows an example of the waveform of the driving current of a prior art timepiece stepping motor.

In FIG. 2, an example of the circuit construction for a conventional stepping motor system is shown. The frequency of an oscillating signal from an oscillating circuit 10 is divided continuously by a frequency dividing circuit 11. These frequency divided signals are converted into two signals each having a pulse width of 7.8[ms] and a period of 2[sec] and being out of phase or dephased by 1[sec] from each other by using a pulse combining circuit 12, and these signals are applied to the inputs 15 and 16 of driving inverters 13*a* and 13*b*. Therefore, an alternate polarity driving pulse which changes the direction of the current every one second is applied to the coil 7, and the rotor 6 magnetized so as to have two poles can be sequentially rotated by steps of 180 degrees. An example of the current waves of the driving coil is shown in FIG. 3.

Figure 4A:
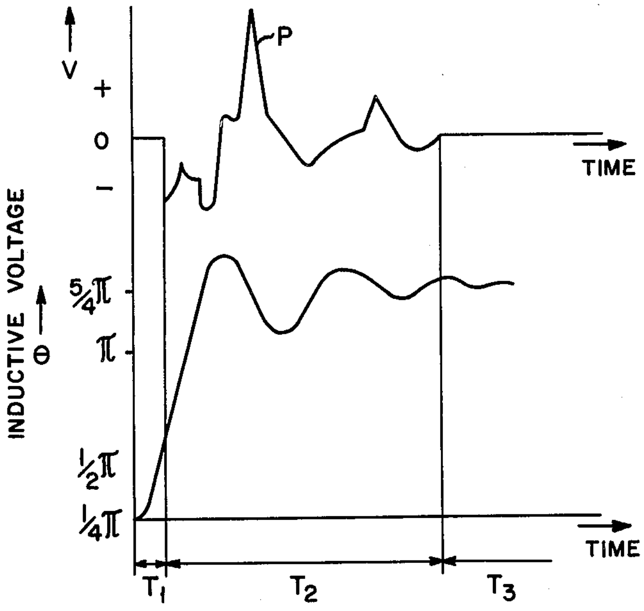
FIG. 4*a* and FIG. 6*a* are graphs showing the relationship between a rotational angle $\theta$ of a rotor and an induced voltage after driving.
Figure 4B:
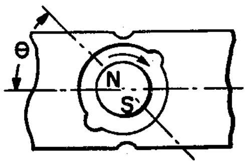
FIG. 4*b* and FIG. 6*b* are schematic representations of angle $\theta$.

FIG. 4(*a*) shows the time relation between the produced voltage waveform of the coil and the rotary angle $\theta$ of the rotor, the voltage waveform being developed across the terminals of the resistor having a high resistance, such as a resistance of several 10[KΩ], when the resistor having a high resistance is connected to both terminals of the coil after applying the driving pulse to the coil. FIG. 4(*b*) shows the rotary angle which is the angle $\theta$ formed between the horizontal axis of the stator and one of the rotor poles, in this case the N pole.

A section "$T_1$" is the time during which the driving pulse is applied to the coil with the resistor having a high resistance (the detection resistor) not connected to the circuit and therefore the produced voltage waveform does not appear. The voltage in section "$T_2$" is the voltage which is produced in the coil by the rotational and vibrational movement of the rotor after being driven. Since the voltage waveform in the section "$T_2$" changes in response to the load condition and the driving condition of the stepping motor, the detection of the changes of the voltage waveform during section $T_2$ makes it possible to detect the movement of the stepping motor.

Figure 5:
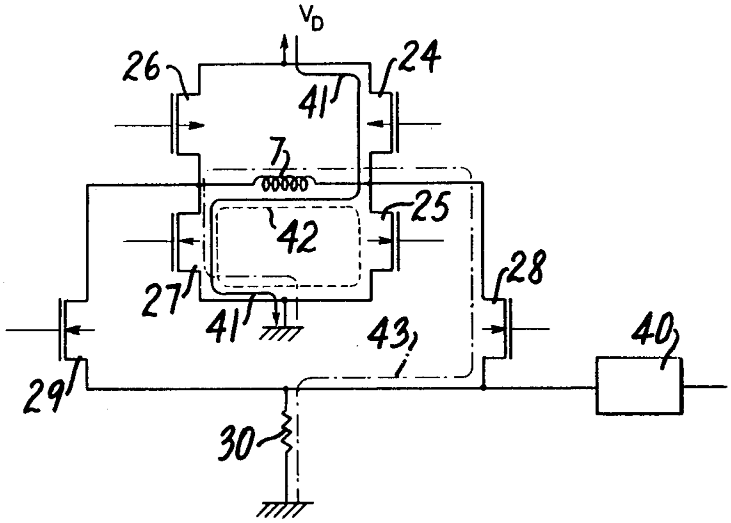
FIG. 5 is an example of a movement detection circuit for a rotor according to another principle.
Figure 6A:
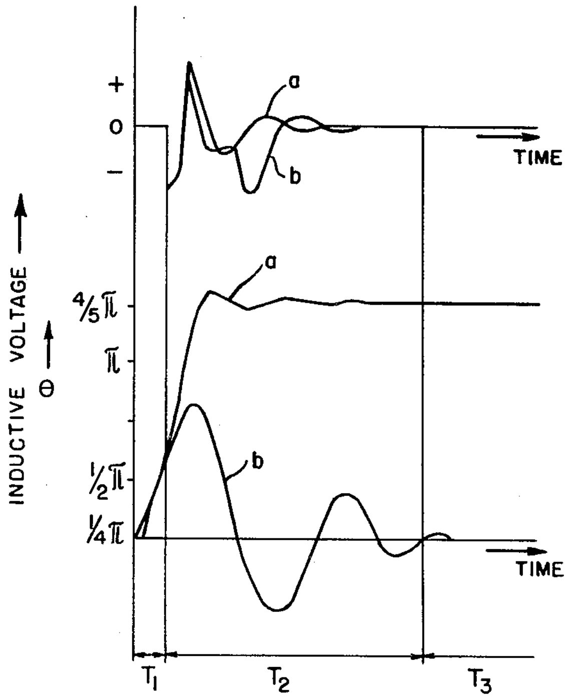
Figure 6B:
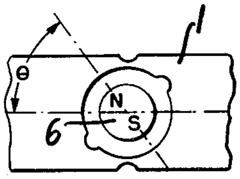

FIG. 5 shows an example of the detection circuit according to this principle. The gages 24, 25, 26, 27, 28 and 29, the detection resistor 30 and the coil 7 are connected as shown. The conjunction point of the detection resistor 30 is connected to an input terminal of a voltage detector 40 with a predetermined threshold level. When the normal driving pulse is applied to the coil through the path 41 and the coil is energized, the rotor is driven. After that, during the movement of the rotor, switching action is intermittently accomplished between the condition wherein both terminals of the coil are grounded through a path 42 to make a short circuit condition, and the condition wherein a closed loop including the detection resistor 30 having a high value of resistance is momentarily formed. The effect of the intermittent switching action will be explained later. At first, to simplify the explanation, the condition wherein a closed loop including the detection resistor 30 is formed at the time when the rotor has just driven will be explained. FIG. 4*a* shows the waveform of the voltage produced across the detection resistor 30 in a such a condition. In FIG. 4*a*, the stepping motor is approximately in a no load condition. FIG. 6*a* shows the time relation between the produced voltage waveforms at the maximum load condition (curve "a") and the over-load condition (curve "b") and the rotary angle $\theta$ of the rotor while FIG. 6*b* shows the rotary angle $\theta$ which is the angle formed between the horizontal axis of the stator and one of the rotor poles, in this case the N pole. Since the rotational speed of the rotor in the maximum load condition "a" is slow and the magnitude of the vibration thereof after the revolution of one step is small, the waveform of the produced voltage has less irregularity. In the over-load condition "b", the peak voltage is produced in the negative direction when the rotor returns back to the original position. However, the waveform of the produced voltage has in general less undulations except for the above-mentioned portion.

Although there are many methods for detecting whether the rotor has rotated, by use of the waveform of the produced voltage of the rotor when the method in which the condition of the rotor is detected by detecting the existance of the peak wave-form "P" is employed, the circuit can be simplified and the condition of the rotor can be accurately detected. That is, the condition of rotation or nonrotation is determined on the basis of whether the terminal potential at the detection resistor 30 reaches above a predetermined potential within the predetermined time which is supposed to produce the peak "P" after the termination of a few milli-seconds of the application of the drive pulse according to this method, however, the rotor is considered to be in a non-rotating condition despite the fact that the rotor rotates in a condition of maximum load as shown in FIG. 6*a*. In this condition such an error operation errs on the safety side when this principle is utilized in the correction driving system such as the present invention. Furthermore, in this case, since the correction pulse having the same polarity is merely excessively produced, no over-rotating operation of the rotor ever occurs.

Figure 7:
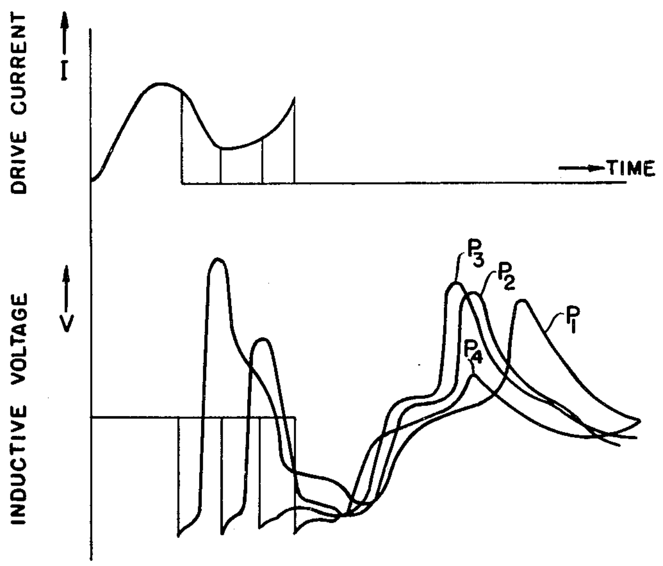
FIG. 7 shows an induced voltage waveform and a current waveform at the time when the pulse width of a driving pulse is varied.
Figure 8:
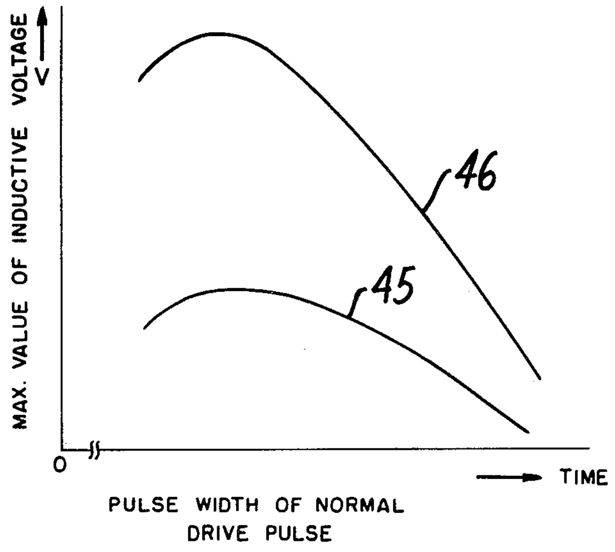
FIG. 8 is a graph showing the relation between the pulse width of a driving pulse and the peak potential of an induced voltage.

FIG. 7 shows the waveforms of the produced voltage in the coil after driving with the application of the normal driving pulses having various pulse widths. It can be seen from this figure that when the pulse width of the normal driving pulse becomes longer than a predetermined width, the peak value, in the produced voltage waveform, becomes lower as shown by "$P_4$", in spite of being in the condition of a no-load and a normal rotation. To explain this more clearly, FIG. 8 is shown in which the axis of the abscissa represents the pulse width of the normal driving pulse and the axis of the ordinate represents the peak voltage of the produced voltage. Numeral reference 45 represents the curve during the condition wherein the closed loop is formed by continuously connecting the detection resistor to the coil in series after driving as described hereinbefore, and numeral reference 46 represents the curve in the condition that the detection resistor is intermittently connected in the closed loop as described hereinafter.

Now, the effect obtained by continuously connecting the detection resistor to the coil in series after the application of the driving pulse will be explained. In the conventional driving circuit as shown in FIG. 2, to carry out the driving operation by the use of two inverters, both terminals of the motor are shorted by use of the resistor having low resistance in the driver constructing the inverter when the motor is in the non-operating condition. Therefore, the current flow by the voltage developed in the coil flows into the short-circuit of the path 42 in FIG. 5. The current causes Joule heat in the resistor and the driving transistor and as a result of this, the rotor is damped. When the closed loop is formed by means of the path 43 shown in FIG. 5 in order to detect the produced voltage, since the detection resistor 30 having a high impedance in addition to the driving circuit is connected in series, the current flowing through the damping circuit is small compared with the former.

Then, switching action between the two circuits at the time of the braking operation for the rotor causes the prompt change of the current in the circuit. However, since the inductance of the coil of the motor is large, the circuit can not follow in response to the change of current. As a result, the circuit shows the response characteristics of a first-delay having the time constant "$\tau = L/R$", which depends on the inductance "L" of the coil and the resistance $Rd = (R + R_{30})$ of the braking circuit. The value of the voltage produced across the detection resistor 30 at this time is approximately zero volts when the braking circuit is constructed by use of the path 42 as shown in FIG. 5, and at the moment of switching to the path 43, the coil 7 operates so as to maintain the flow of the current at the braking operation through the path 42. As a result, a high value of voltage is instantaneously developed across the detection resistor 30 having high impedance.

After this, this high value of voltage is reduced in accordance with the time constant "$\tau$".

Figure 9:
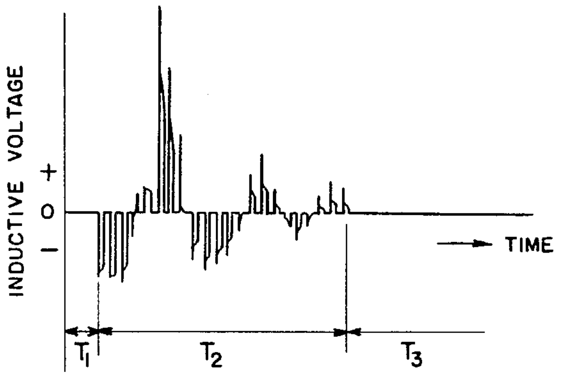
FIG. 9 shows an example of a waveform of an induced voltage at the time when the movement of a rotor is detected.

FIG. 9 shows an example of the waveform of the voltage produced across the detection resistor 30 at this time. It is a feature of this method that amplifying the voltage produced by the motor at the time the braking action is possible by only changing the value of the resistor in the circuit for braking the rotor, and that the maximum value of the peak voltage reaches the value beyond the voltage value (about 1.5 V) of the power supply of the driving circuit when the detection resistor is intermittently connected as shown by reference curve 46, whereas the maximum value of the peak voltage is about 0.8[V] at most when the produced voltage is continuously detected as shown by reference curve 45 in FIG. 8. Consequently, it is very easy to detect such a voltage. Now, as seen from FIG. 8, it should be noted that when the pulse width of the normal driving pulse is increased to some degree, the undulations of the produced voltage can be detected.

Figure 10:
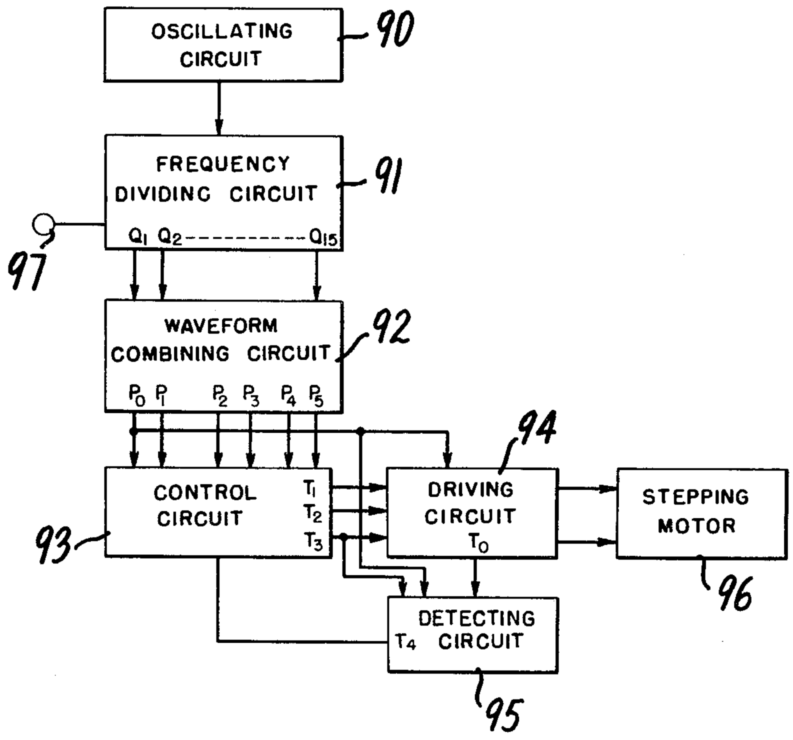
FIG. 10 is a block diagram of an embodiment according to the present invention.

FIG. 10 shows a block diagram of an embodiment of the present invention.

Numeral 90 represents an oscillating circuit, in which a quartz vibrator having a vibrating frequency of 32,768[hz] is normally used. Numeral 91 is a frequency dividing circuit which consists of fifteen flip-flops thereby the timing signal of 1-second is obtained by the frequency dividing circuit.

Figure 11:
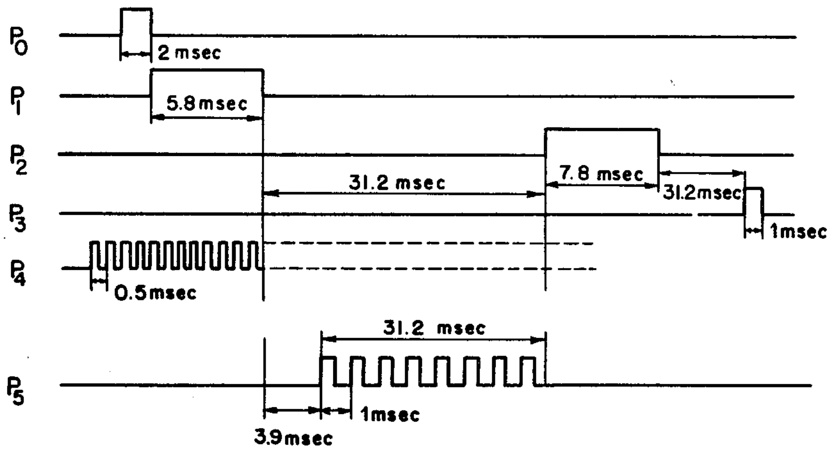
FIG. 11 is a timing chart of the pulse required for the embodiment of FIG. 10.

Reference numeral 97 is a reset-input of the watch, and all of the frequency dividing stages are reset by the application of the reset input. Reference numeral 92 is a waveform combining circuit in which desired pulses are obtained from the combination of the output signals of the flip-flops of the frequency dividing circuit 92 using NAND gates and NOR gates, as shown in the timing chart in FIG. 11. Since the waveform combining circuit can be easily designed by using logic circuits, the schematic diagram thereof is omitted.

Figure 12:
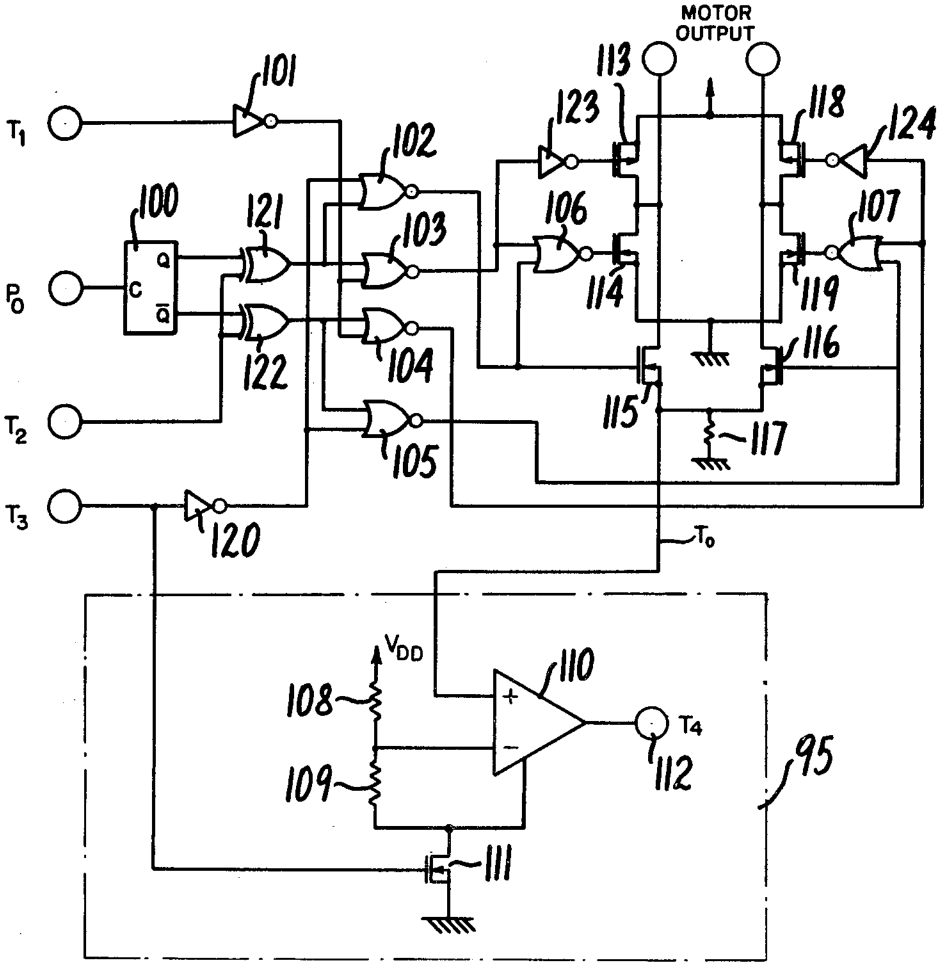
FIG. 12 shows an embodiment of a driving circuit and detecting circuit.

FIG. 12 shows a circuit diagram of a driving circuit 94 and a detecting circuit 95 shown in FIG. 10 and, an input terminal "$T_1$" is an output terminal of a control circuit 93 shown in FIG. 10. Only when the terminal "$T_1$" is at a high level "H" is one output terminal to stepping motor 96 "H" and the other terminal to the stepping motor at a low level "L" and as a result, a current flows into the stepping motor 96. The output signal from the control circuit 93 shown in FIG. 4*a* is applied to a terminal "$T_2$". Signals Q and $Q^-$ of a flip-flop 100 are applied to Ex-OR during the period, the output of the Ex-OR 121, 122 is logically inverted with respect to the output of the flip-flop 100 when $T_2$ becomes "H". As a result, it is possible to invert the direction of the current flowing through the motor.

In this embodiment, the motor is driven by utilizing the correction pulse "$P_2$" when the rotor can not be rotated by the application of the normal driving pulse, and the pulse "$P_3$", which is opposite to the pulse "$P_2$", is subsequently applied again. This is because, in the motor of the one-piece stator type, the magnetic saturation time of the saturable magnetic path in the one-piece stator at the time of the application of the next driving pulse becomes longer when the correction driving operation is carried out by using the pulse "$P_2$" as well as the effective pulse width is reduced. From this reason, as the opposite pulse "$P_3$" is applied to the coil of the stepping motor 96 when the correction driving operation is carried out by the application of the pulse "$P_2$", the stator is magnetized in the direction according to the direction of the next driving pulse, and then, the time required for a saturation of the narrow portion of said one piece stator can be reduced.

The output "$T_3$" of the control circuit 93 shown in FIG. 10 is applied to an input terminal "$T_3$", and the operation for detecting the rotating condition is carried out by using this pulse in accordance with the above-mentioned method in which the voltage produced after the rotation of the rotor is utilized.

When the pulse "$P_0$" having a period of 1-second is applied to the flip-flop (which will be referred to hereinafter as F/F, 100), the F/F 100 develops the signal having a frequency of ½[hz], the output "Q" is applied to the Ex-OR gate 121 and, the output "$\overline{Q}$" is applied to the Ex-OR gate 122. To another input terminal of each of Ex-OR gates 121 and 122, the output "$T_2$" is applied. The output of the Ex-OR gate 121 is connected to NOR gates 102 and 103, and the output of the Ex-OR gate 122 is connected to NOR gates 104 and 105.

The output signal of inverter 101 is applied to NOR gates 103 and 104. The output "$T_3$" of the control circuit 93 is applied to NOR gates 102 and 105 through inverter 120.

The output of the NOR gate 102 is connected to a first input terminal of a NOR gate 106 and to the gate of an N-type MOS FET 115.

The output of the NOR gate 103 is connected to the gate of a P-type MOS FET 113 and is used for driving the stepping motor through inverter 123 and to a second input terminal of the NOR gate 106.

The output of the NOR gate 104 is connected to the gate of a P-type MOS FET 118 using for driving the stepping motor through inverter 124 and to a first input of a NOR gate 107. The output of a NOR gate 105 is connected to the gate of an N-type MOS FET 116 and to a second input of the NOR gate 107. The output of the NOR gate 106 is connected to the gate of an N-type MOS FET 114 for driving the stepping motor and the NOR gate 107 is connected to the gate of an N-type MOS FET 119 for driving the stepping motor.

A power supply terminal $V_{DD}$ is a power input terminal of positive polarity, and to which the source electrodes of P-type MOS FETs 113 and 118 are connected.

The source electrodes of the N-type MOS FETs 114 and 119 are grounded, the drain electrodes of the P-type MOS FET 113 and the N-type MOS FET 114 are connected to each other. These drain electrodes are connected to one output terminal of the coil of the stepping motor 96 and to the drain electrode of the N-type MOS FET 115 for detection.

The drain electrodes of the P-type MOS FET 118 and the N-type MOS FET 119 are connected to each other, and furthermore, these drain electrodes are connected to the other output terminal of the coil of the stepping motor 96 and the drain electrode of the N-type MOS FET 116.

The source electrodes of the N-type MOS FETs 115 and 116 are connected to each other and the conjunction point is connected to one side of the resistor 117. The other side of the resistor 117 is grounded.

The conjunction point of the N-type MOS FETs 115, 116 and resistor 117 is connected to the positive input terminal of a comparator 110.

The signal appearing at the conjunction point $T_0$ is the detection signal showing whether the rotor has rotated or not, and the circuit comprising the resistors 108, 109, the comparator 110 and the N-type MOS FET 111 is an embodiment of the detecting circuit 95. If the detection signal $T_0$ can be detected by utilizing the threshold voltage of a CMOS gate circuit, CMOS inverter may be used in lieu of the comparator 110.

One side of the resistor 108 is connected to the power source $V_{DD}$, and the other side of the resistor 108 is connected to the resistor 109. In this case this conjunction point is connected to the negative input terminal of the comparator 110. The other side of the resistor 109 is connected to the drain electrode of the N-type MOS FET 111 for inhibiting the detecting operation and it is grounded through the source electrode. The ground terminal of the comparator 110 is also connected to the drain electrode of the N-type MOS FET 111 and it is grounded through the source electrode.

The output signal from the comparator 110 is produced at a terminal 112 as a signal $T_4$ and it is applied to the control circuit 93 as shown in FIG. 17.

The comparator used in the detecting circuit 95 according to the present invention is constructed by using CMOS and, its operation will be briefly explained hereinafter.

Figure 13A:
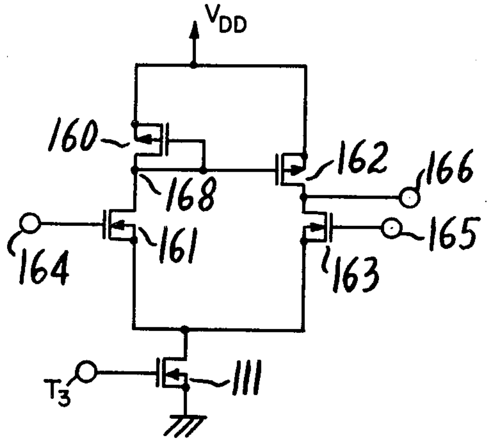
FIGS. 13*a* and 13*b* are a detailed constructional diagram and a block diagram of a comparator.
Figure 13B:
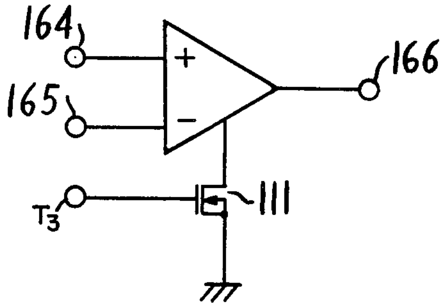

FIG. 13(*a*) and 13(*b*) show an embodiment of the comparator 110, wherein FIG. 13(*a*) is a detailed explanation view and FIG. 13(*b*) is a block diagram.

Figure 14:
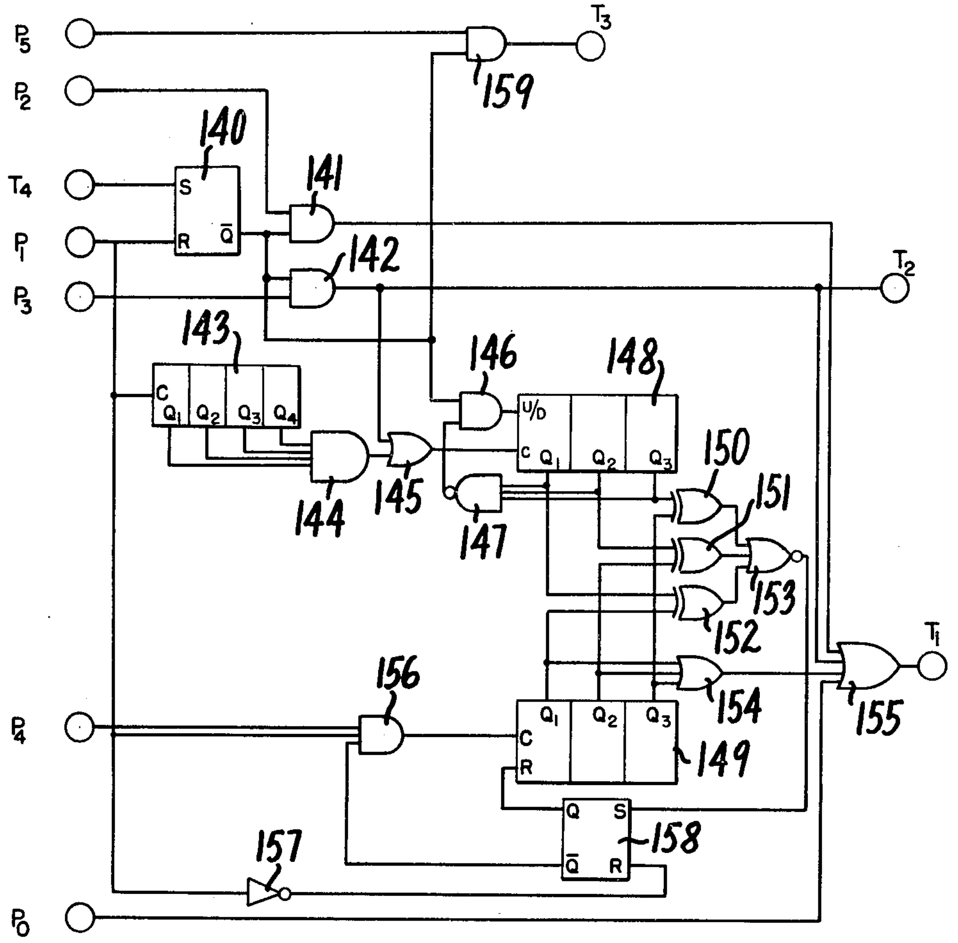
FIG. 14 is an example of a construction of a control circuit.

FIG. 14 shows an example of the circuit of the control circuitry 93 shown in FIG. 10.

This control circuitry 93 controls the correction drive operation in response to the detection of the rotor rotation and also controls so as to minimize the width of the normal driving pulse signal $P_1$.

The output signal "$T_4$" from the detecting circuit 95 is applied to the set-input terminal "S" of a SR-F/F 140. The signal $P_1$ from the waveform combining circuit 92 is applied to a reset terminal "R" of a SR-F/F 158 through the inverter 157, a clock input terminal c of a binary counter 143 and an input terminal of an AND gate 156. To AND gate 141, the output signal "$P_2$" of the waveform combining circuit 92 and the $\overline{Q}$ output of SR-F/F 140 is applied. To AND gate 142, the output $P_3$ from the waveform combining circuit 92 and the $\overline{Q}$ output of the SR-F/F 140 are applied and the output signal thereof is applied to a driving circuit as "$T_2$". To AND gate 159, the output "$P_5$" from the waveform combining circuit 92 and the $\overline{Q}$ output of the SR-F/F 140 are applied and the output signal "$T_3$" therefrom is applied to the driving circuit 94.

In this embodiment, the binary counter 143 consists of four stages of flip-flops, the output signals $Q_1$–$Q_4$ from each stage being applied to the AND gate 144. To OR gate 145, there are applied the output of the AND gate 144 and the output of the AND gate 142. To AND gate 146, there are applied the $\overline{Q}$ output from the SR-F/F 140 and the output of NAND gate 147. In up/-down counter 148, the output of the AND gate 146 is applied to an U/D input (up/down control input) and the output of the OR gate 145 is applied to a clock input "C". In this embodiment, the up/down counter 148 has three stages of flip-flops, the outputs $Q_1$, $Q_2$ and $Q_3$ are respectively applied to the NAND gate 147, and each of the outputs "$Q_1$", "$Q_2$" and "$Q_3$" are applied to the Ex-OR gates 152, 151 and 150, respectively. The outputs $P_1$ and $P_4$ of the waveform combining circuit 92 and the $\overline{Q}$ output of the SR-F/F 158 are applied to AND gate 156. In binary counter 149, the output of AND gate 156 is applied to the clock input "C", and the "Q" output of the SR/F/F 158 is applied to the reset input "R" of counter 149. In this embodiment, the binary counter 149 consists of three stages of flip-flops, each of outputs $Q_1$, $Q_2$ and $Q_3$ are respectively applied to inputs of OR gate 154, and each of outputs $Q_1$, $Q_2$ and $Q_3$ are applied to Ex-OR gages 152, 151 and 150, respectively. The outputs of the Ex-OR gates 150, 151 and 152 are applied to the inputs of NOR gate 153 and the output of the NOR gate 153 is applied to the set input "S" of the SR-F/F 158. The output of the AND gate 141, the output of the AND gate 142, the output of the OR gate 154 and the output "$P_0$" of the waveform combining circuit 92 are respectively applied to OR gate 155, and the output "$T_1$" thereof is applied to the driving circuit.

The operation of the embodiment will hereinafter be explained.

Since the SR-F/F 140 is in the set condition by the application of the detection signal "$T_4$" when the rotor has been rotated and then the $\overline{Q}$ output becomes "L", all of the outputs of the AND gates 141, 142, 146 and 159 become "L". As a result of this, the output "$T_3$" of the AND gate 159 becomes "L" at the moment when the normally rotated condition is detected, and after this, the detection circuit is in an inhibit condition. Since the up/down counter 148 can be operated as an up counter when the U/D input is "H" and the up/down counter 148 can be operated as a down counter when the U/D input is "L", the counter 148 acts as a down counter when the rotor is normally rotated.

At this time, since the output "$P_1$" from the waveform combining circuit is applied to the clock input "C" of the binary counter 143 once every second, in the case of the binary counter 143 consisting of four stages of flip-flops, such as in this embodiment, the output of the AND gate 144 becomes "H" every sixteen seconds. This output is applied to the clock input "C" of the up/down counter 148 through the "OR" gate 145, and the counting content in the up/down counter 148 is reduced by 1 every sixteen seconds.

On the other hand, since the output $P_4$ of the waveform combining circuit 92 is a signal with a frequency of 2048[Hz], the period of the output is about 0.5[ms], and the output is applied to the clock input "C" of the binary counter 149 through the AND gate 156 only when the output "$P_1$" of the waveform combining circuit 92 is "H". In this embodiment, the binary counter 149 consists of three stages of flip-flops. The Ex-OR gates 150, 151 and 152 always check whether the output of the binary counter 149 is coincident with the output of the up/down counter 148 and, when both of the outputs coincide in value, all of the outputs of the Ex-OR gates 150–152 become "L" and the output of the NOR gate 153 becomes "H". Therefore, the SR-F/F 158 is set, the "Q" output becomes "H" and the binary counter 149 is reset. As a result of this, the output of the "OR" gate 154 becomes "H" and the time width of the output $T_1$ is equal to the value of the product of the number of counts in the up/down counter 148 and time of 0.5[ms].

On the other hand, in the case wherein the output $T_4$ of the detecting circuit 95 does not produce any signal that is "H" within the time for detection, it is understood that the rotor has not been rotated by the application of the first normal driving pulse, and the $\overline{Q}$ output of the SR-F/F 140 remains in the "H" condition. As a result, the output $P_2$ from the waveform combining circuit 92 is produced from the output of the OR gate 155 intact, and the output of the OR gate 155 permits the motor to carry out the correction drive. The output "$P_3$" of the waveform combining circuit 92 is derived from the output of the AND gate 142 as the signal "$T_2$", and the signal "$T_2$" is applied to the driving circuit 94. At this time, since the circuit 94 controls the current direction in such a way that the current flows in the direction which is opposite to the direction of the current flowing through the coil of the motor in the condition of the correction driving, and at the same time the signal from the output "$T_1$" of the OR gate 155 is applied to the driving circuit 94, the effects due to residual magnetism in the stepping motor can be eliminated. Therefore, the elimination of the saturation time for the saturable magnetic path can be carried out. Moreover, since the "$\overline{Q}$" output of the RS-F/F 140 is "H", the output of the AND gate 146 becomes "H" and the U/D input of the up/down counter 148 becomes "H". The up/down counter is therefore set in the up counting mode, and the output "$P_3$" of the waveform combining circuit 92 is applied to the clock input "C" of the up/-down counter 148 through the AND gate 142 and the OR gate 145. As a result, the counting content in the up/down counter 148 is incremented by one, and the length of the driving pulse produced in the next time interval becomes longer by 0.5[ms]. All the outputs $Q_1$, $Q_2$ and $Q_3$ of the flip-flops in the up/down counter 148 become "H" upon further incrementation and the situation occurs wherein the contents in the counter could become all "L" at the time of the application of the next up input. To inhibit this condition, the output of the AND gate 146 becomes "H" when all the inputs of the NAND gate 147 become "H", and the up/down counter 148 is then operated as a down counter. As a result, the condition that the contents of the counter 148 becomes all "L" is inhibited.

It is the role of the output "$P_0$" of the waveform combining circuit to decide the minimum pulse width of the normal driving pulse. This is because a great deal of energy is lost until the condition is reached wherein the motor is driven by a pulse having a constant width, if the pulse width increases from 0[ms] of a pulse width. In this embodiment, the minimum pulse width of the driving pulse is set at about 1.9[ms].

The counting contents of the up/down counter 148 are not reset even if the frequency dividing circuit 91 is reset and the change in the pulse width of the driving pulse is started from the value of the pulse width before the reset operation even if the reset condition is released.

When the pulse width of the driving pulse for the stepping motor is too short for rotating the stepping motor, it is impossible to rotate the stepping motor by the pulse width of the normal driving pulse. Therefore, since the output signal "$T_4$" from the detecting circuit is "L", the $\overline{Q}$ output of the SR-F/F 140 becomes "H" and the output signal $P_2$ from the waveform combining circuit 92 is applied to the stepping motor 96 as the correction driving pulse. The pulse width of the signal is set in order that the maximum torque of the stepping motor is assured. In this embodiment, this width is set at 7.8[ms]. Since the up/down counter 148 acts as an up counter when the output $P_3$ of the waveform combining circuit 92 is applied, the counting contents are incremented by 1. Therefore, if the pulse width of the driving pulse produced after one second is 1.9[ms], the pulse width of the normal driving pulse developed after two seconds becomes equal to the total pulse width of the output "$T_1$"=1.9[ms] from the waveform combining circuit and 0.5[ms]. That is, it becomes a driving pulse having a width of 2.4[ms]. In addition, if the motor can not be rotated by the application of the pulse having such a pulse width, the motor is further driven by the correction driving pulse having a width of 7.8[ms].

By the control of the control circuitry 93, the stepping motor can be driven by a driving power corresponding to the load variation and also operated at relatively low power.

Figure 15:
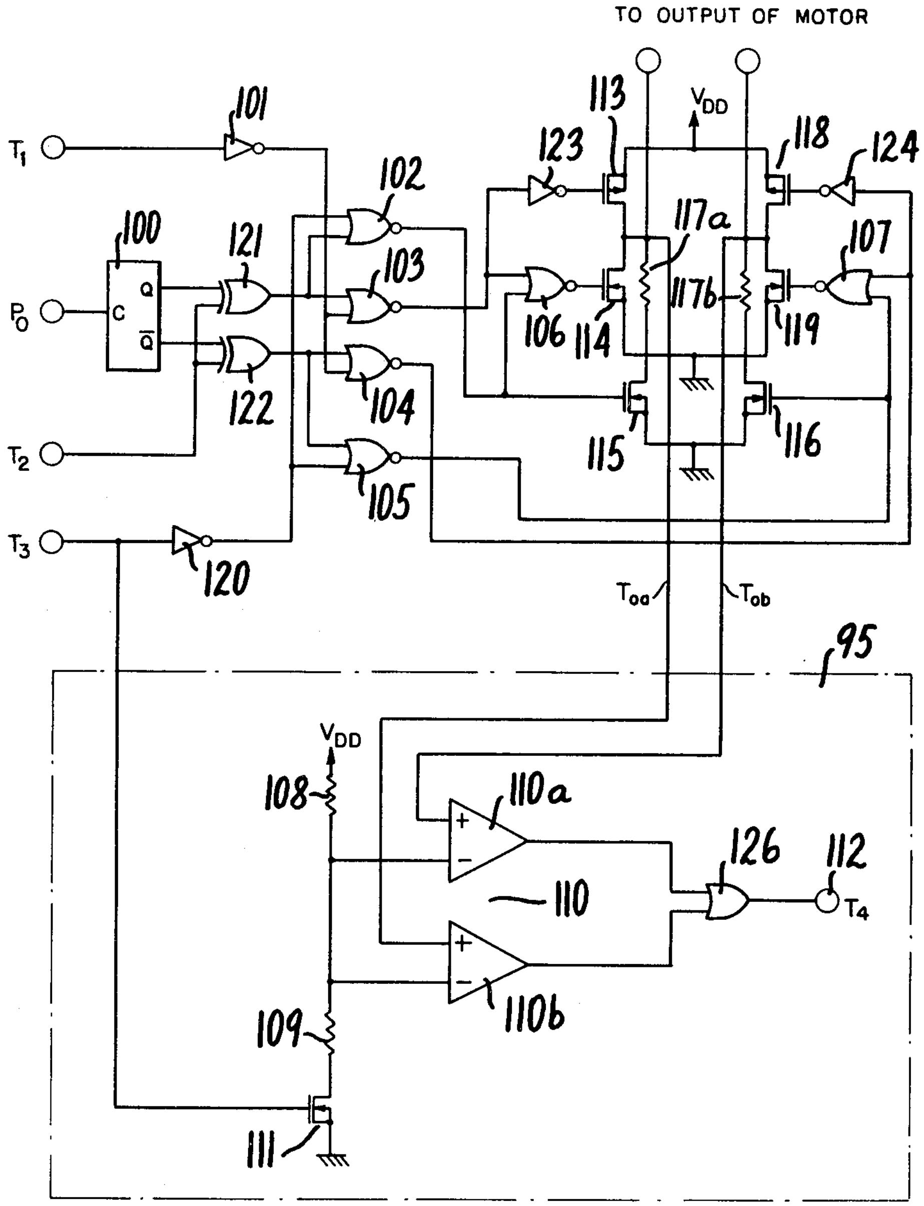
FIG. 15 is another embodiment of driving and detecting circuitry.

FIG. 15 shows another embodiment of the driving and detection circuits of FIG. 10. One terminal of a stepping motor is connected to a switching NMOSFET 115 via detection resistor 117a and another terminal is connected to a switching NMOSFET 116 via a detection resistor 117b. The terminals of the stepping motor are directly connected to the "+" inputs of comparators 110a and 110b so that a detection signal which is generated in the coil of the stepping motor is directly treated whereby an accurate detection is attained without deformation of the detection signal.

The output signal of the comparators 110a and 110b are digital signals and are applied to OR-gate 126 whereby the output of said OR-gate 126 is applied to a terminal 112.

The output of the terminal 112 is applied as $T_4$ to the circuitry of FIG. 14, therefore it is possible to obtain very accurate detection of the rotor rotation. Further, a standard voltage which is applied to one input terminal of the voltage comparator 110 is changed according to a change of supply voltage $V_{DD}$ in the embodiments of FIGS. 12 and 15. Namely, if the voltage which is applied to the resistors 108 and 109 for setting a standard voltage is constant without connection to a power voltage, it is possible to constantly detect a rotation or non-rotation condition of the rotor under a constant detection condition whereby the operation of the detection circuit is greatly stabilized.

Figure 16:
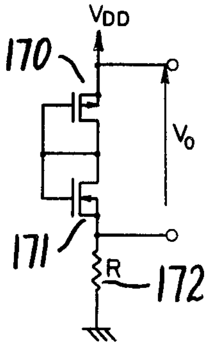
FIG. 16 is a constant voltage circuit.

FIG. 16 shows one embodiment of a constant voltage circuit. The source electrode of PMOSFET 170 is connected to the positive terminal of the power source $V_{DD}$, the gate and drain electrodes are connected to the gate and drain electrodes of NMOSFET 171 and to each other and the source electrode of NMOSFET 171 is connected to the negative terminal of the power source $V_{DD}$ via a resistor 172.

The threshold voltage of PMOSFET 170 is "$V_{TP}$", the K-factor thereof is "$K_P$", the threshold voltage of NMOSFET 171 is "$V_{TN}$", the K-factor thereof is "$K_N$", the resistance of resistor 172 is "RΩ", whereby the following formula is obtained:

$$V_0 = V_{TN} + V_{TP} + \sqrt{\frac{V_{DD}}{R_{kP}}} + \sqrt{\frac{V_{DD}}{R_{kN}}}$$

Therefore, if "R" is larger than $V_{DD}$/kP and $V_{DD}$/kN, $V_0$ is not changed even if "$V_{DD}$" is changed.

In the present embodiment, the resistor 172 is 500k and $V_0$ is about 1.2 V.

As mentioned above, according to the invention no external member connected to be driven by the motor is required as the rotation detection is executed by the peak value induced by the motion of the rotor after driving of the stepping motor. And the detection according to the invention is executed readily since the induced voltage in the coil is amplified by means of a simple gate operation.

As shown in FIG. 8, in case of switching between the low impedance loop and the high impedance loop, the peak value of the induced voltage in the coil is 1.8 volts. On the other hand, in case of not switching between the low impedance loop and the high impedance loop, the peak value of the induced voltage in the coil is 0.8 volts.

The latter is required to have a comparator threshold voltage of 0.3 volts for detecting the rotation and non-rotation of the rotor. However, in the case that the power source voltage of the device is 1.5–3 volts the detection sensitivity becomes low in the comparator having a threshold voltage of 0.3 volts so that the induced voltage in the coil is required to be amplified by an analog amplifier in order to obtain an appropriate detection sensitivity.

On the other hand, the former can set the threshold voltage of the comparator to 0.3–1.3 volts and distinguish between the rotation and the non-rotation of the rotor by using a logic circuit such as an inverter.

Accordingly, a driver circuit for a stepping motor according to the invention is stable in operation since it uses digital elements except for a resistor in spite of dealing with an analog signal.

We claim:

1. In a driver circuit for a stepping motor having a coil, a stator and a rotor, and receptive of pulse signals from a pulse signal generator to rotationally drive said rotor, the improvement wherein said driver circuit comprises means for detecting a voltage induced in said coil by momentarily connecting said coil to a high impedance element soon after application of a pulse signal from said pulse signal generator, and means for comparing the induced voltage in said coil with a predetermined voltage and providing a corresponding output signal indicative of whether or not said rotor has undergone incremental rotation in response to the applied pulse signal.

2. In a driver circuit for a stepping motor having a coil, a stator and a rotor, and receptive of pulse signals from a pulse signal generator to rotationally drive said rotor, the improvement comprising: means switchable between a high impedance loop which includes said coil and a low impedance loop which includes said coil to cause a voltage to be induced in said coil; and detecting means for detecting the induced voltage in said coil.

3. A driver circuit for a stepping motor as claimed in claim 2; wherein said switchable means includes means for alternately switching between said high impedance loop and said low impedance loop in response to a detection signal of a relatively higher frequency than said pulse signal from said pulse signal generator.

4. A driver circuit for a stepping motor as claimed in claim 3; wherein said switchable means forms said high impedance loop comprised of a high impedance element and said coil after the pulse signal is applied to said stepping motor; and comparing means for comparing a voltage developed across said high impedance element with a predetermined voltage.

5. A driver circuit for a stepping motor as claimed in claim 4; wherein said predetermined voltage has a value corresponding to the threshold voltage of a C-MOS logic circuit.

6. A driver circuit for a stepping motor as claimed in claim 4; wherein the impedance value of said high impedance element is over five times as high as the direct resistance value of said coil.

7. A driver circuit for a stepping motor as claimed in claim 2; wherein said switchable means selectively forms one of two high impedance loops by connecting said high impedance element selectively to either one terminal of said coil or the other terminal of said coil and one of the two loops is selected in response to the energized polarity of said coil.

8. A driver circuit for a stepping motor as claimed in claim 7; wherein the two high impedance loops include at least two high impedance elements connected with one terminal and the other terminal of said coil respectively and the other terminals of said two high impedance elements being connected through a gate to a reference voltage level respectively.

9. In a circuit for detecting the voltage induced in a coil of a rotary stepping motor of the type having a driving transistor connected to the coil, the improvement comprising: means switchable between a first state wherein a first closed loop is formed which includes the coil and a relatively low impedance element and a second state wherein a second closed loop is formed which includes the coil and a relatively high impedance element; means for switching the switchable means into the first state during the driving of the coil and into the second state thereafter so that a voltage is induced in the coil; and means for detecting the induced voltage in the coil.

10. A circuit according to claim 9; including means responsive to the detected induced voltage for providing an output signal indicative of the rotational state of the stepping motor.

* * * * *